S. MUELLER.
MACHINE FOR FOLDING NOODLES.
APPLICATION FILED DEC. 2, 1909.

1,192,336.

Patented July 25, 1916.
6 SHEETS—SHEET 6.

Witnesses:

Inventor
Samuel Mueller
BY Conrad A. Dieterich
his ATTORNEY

UNITED STATES PATENT OFFICE.

SAMUEL MUELLER, OF JERSEY CITY, NEW JERSEY.

MACHINE FOR FOLDING NOODLES.

1,192,336.

Specification of Letters Patent.

Patented July 25, 1916.

Application filed December 9, 1907. Serial No. 631,048.

*To all whom it may concern:*

Be it known that I, SAMUEL MUELLER, a citizen of the United States, residing at Jersey City, Hudson county, in the State of New Jersey, have invented certain new and useful Improvements in Machines for Folding Noodles, of which the following is a full, clear, and exact specification.

My invention relates to improvements in machinery for working noodles and analogous dough products and the same has for its object more particularly to provide a simple, efficient and reliable machine whereby a sheet of dough may be cut into a plurality of longitudinal bodies or strips and the same then folded or folded and interlocked.

Further, my invention has for its object to provide a machine in which the noodles are first folded at intermediate portions and then the ends thereof spaced or spread apart whereupon the folded noodle is again doubled upon itself to form outwardly extending members which diverge in a direction opposite to that of the first folding.

Further, said invention has for its object to provide means whereby the severed noodles may be divided into sections containing a greater or smaller number in order to facilitate the packing thereof.

Further, said invention has for its object to provide a machine in which a series of folded noodles may be delivered bodily to a conveyer by means of which the same are then conducted from the machine to suitable supports for drying.

To the attainment of the aforesaid objects and ends, my invention consists in the novel details of construction and in the combination, connection and arrangement of parts hereinafter more fully described and then pointed out in the claims.

In the accompanying drawings forming a part of this specification wherein like numerals of reference indicate like parts. Fig. 6 is a detail perspective view showing the horizontal carrier and folder.

In said drawings 20 denotes a frame comprising vertical side members 21 21 having offset lower portions 21ᵃ 21ᵃ and 22 22, and 23 denotes transverse members uniting the vertical frame members 21 21. Each of said frame members 21 21 is provided at one of its sides with a horizontal projecting portion 24, and at its opposite side with a shorter projecting portion 25.

26 denotes a main driving shaft which is supported in bearings in the frame members 21 near their upper portions. Upon the outer projecting end of the main driving shaft is a fixed pulley 27, and a loose pulley 28. Within adjustable bearings, 30, 30, working in vertical guides 31, 31, adjacent to their upper ends, are mounted shafts 32 32 upon which are arranged rollers 33 33, and 34 denotes a sprocket wheel fixed upon the end of the driving shaft 26 opposite to the end upon which the fixed and loose pulleys 27 and 28 respectively are mounted.

Upon the outer sides of the bearings 30, directly below the shafts 32 32 are mounted short shafts or studs 34ᵇ 34ᵇ upon which are disposed idle sprockets 35 35, and at the left hand end of the frame member 21 directly below the lower end of the vertical guide 31 is secured a short shaft 36 upon which is mounted an idle sprocket 37.

38 denotes an adjusting screw provided with a hand wheel extending through the bearings 30 and engaging the vertical guide 31 whereby said bearings 30 may be secured to its adjusted position.

39 denotes a sprocket chain which extends over the sprocket 34 on the main shaft 26, and over the sprockets 34ᵃ 34ᵃ of the rollers 33 33, and thence over the idlers 35 35 and 37.

40 40 denote belts or conveyers which extend at their inner ends over the rollers 33 33 and at their outer ends over suitable rollers for conveying the noodle supports or trays into position below the folding mechanism and thence conveying said supports with the folded noodles thereon from the machine.

In the upper portions of the frame members 21 21 are mounted sheeting rollers 41 and 42; the roller 42 being mounted in adjustable spring-supported bearings 43 43 to permit of its being adjusted relatively to the roller 41 by means of a transverse bar 44 disposed in bearings 45 45 arranged in the upper ends of the transverse members 21 21. The bar 44 is provided upon its underside with inclined portions or wedges 46 46 which are adapted to engage the correspondingly inclined upper faces of the bearings 43 43 to force the same and the roll 42 supported therein downwardly.

41ᵃ 42ᵃ denote intermeshing gears fixed upon the left hand ends of the shafts supporting the roller 41, 42.

47 47ᵃ denote cutting rolls which are mounted in the upper ends of the frame members 21 21 in about the same horizontal plane with the sheeting roll 41. Said cutting rolls are provided with a series of annular projections which are adapted to fit between the annular projections of the coöperating roll, and 48 denotes a gear meshing with a pinion 36ᶜ on the main shaft 26, and 48ᵃ a similar gear meshing with a gear 49 fixed upon the shaft of the sheeting roll 41 and a gear 50 fixed upon the shaft of the cutting roll 47. The gear 50 actuates a gear 51 fixed on a shaft 52, mounted in the upper portion of the frame members 21 21 through a gear 53 fixed on the cutting roll 47ᵃ and an intermediate gear 54.

55 denotes a rotary cutter fixed upon the shaft 52 which cutter coöperates with a stationary blade 56 secured at its opposite ends to the side members 21 21 of the frame.

57 denotes a sprocket wheel fixed upon the shaft 52 over which passes a sprocket chain 58 which also passes over a sprocket wheel 59 secured upon the cam shaft 60, mounted in bearings provided in the lower portions of the side members 21 21.

61 denotes a movable folding plate which has its front portion 62 beveled and provided at the edge of its beveled portion with a series of short projections 62ᵃ 62ᵃ, and at its opposite sides with outwardly projecting studs 63 63 provided at their ends with rollers 64 64 adapted to work in horizontal slots 65 65 arranged in the horizontal projecting portions 24 and 25 of the side members 21 21.

66 denotes arms having their lower ends pivotally secured to the side members 21 by bolts 67 67 and their upper ends pivotally secured to the movable folding plate 61.

69 69 denote cams mounted at the opposite ends of the shaft 60, and provided upon the inner surface with cam grooves 70 70 adapted to receive studs 72 72 located upon the outer surfaces of the arms 66 adjacent to their pivoted ends.

Upon the left hand side of the frame directly below the projecting portion 24 of one of the side members 21 is secured a bracket 73 provided with a bearing in which is mounted a short shaft 74 having a sprocket wheel 75 at its outer end, and a cam 76 at its inner end provided with an inwardly projecting portion 77 adapted to engage a roller 78 supported in a bearing 79 upon the underside of a plate or table 80 mounted upon the transverse support 23 and provided with downwardly projecting portions 81 which work in groove guides 82 82 secured at their opposite ends to the side members 21 of the frame, and 83 83 denote springs provided in the transverse members 23 23 which springs serve to hold the roller 78 at the opposite edge of the plate 80 in contact with the inner surface of the cam 76.

84 denotes a sprocket chain which passes over the sprocket wheel 75, and a sprocket wheel 85 secured upon the cam shaft 60 intermediate the right hand cam and frame member 21.

86 denotes a chute comprising a downwardly and outwardly curved member 87 secured at its opposite ends to the side members 21 21 directly below the left hand edge of the plate 80, and a similarly shaped member 88 which is likewise secured intermediate the side members 21 of the frame, and has its upper horizontal portion arranged in alinement with the top of the movable plate 80, and provided at its outer end with an upwardly projecting rim or flange 89.

90 90 denote arms which are united by a transverse member 91 having a curved plate 92 secured at its upper edge to the transverse portion 91 of said arms 90, and 93 denotes an arm secured to the outer side of one of the arm members 90 and pivotally connected to one end of a link 94 which has its lower end pivotally secured to the outer end of a rod 95 which is in turn pivotally secured upon a stud 96 arranged upon a bracket 97 secured to the side frame member 21 directly below the bracket 73 and 98 denotes a stud arranged upon the inner side of said arm 95 and extending into the groove 99 of a cam 100 fixed upon a short shaft 101 mounted in bearings at the outer end of the bracket 97.

The frame members 21 21 are provided at their upper right hand ends with brackets 102 102 each having a recess 103 103 adapted to receive a spindle carrying a roll of sheeted dough 104.

Figure 7:
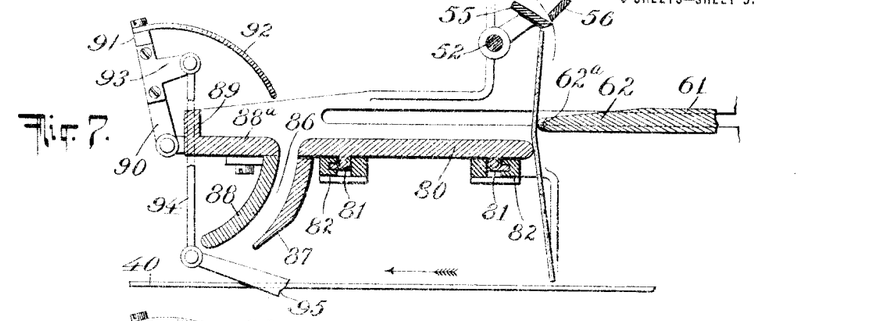
Figs. 7, 8, 9 and 10 are detail sectional views showing the operation of initially folding, conveying and then doubling the folded noodle and delivering the same to a suitable support carried upon a conveyer working beneath the folding mechanism.
Figures 8, 9:
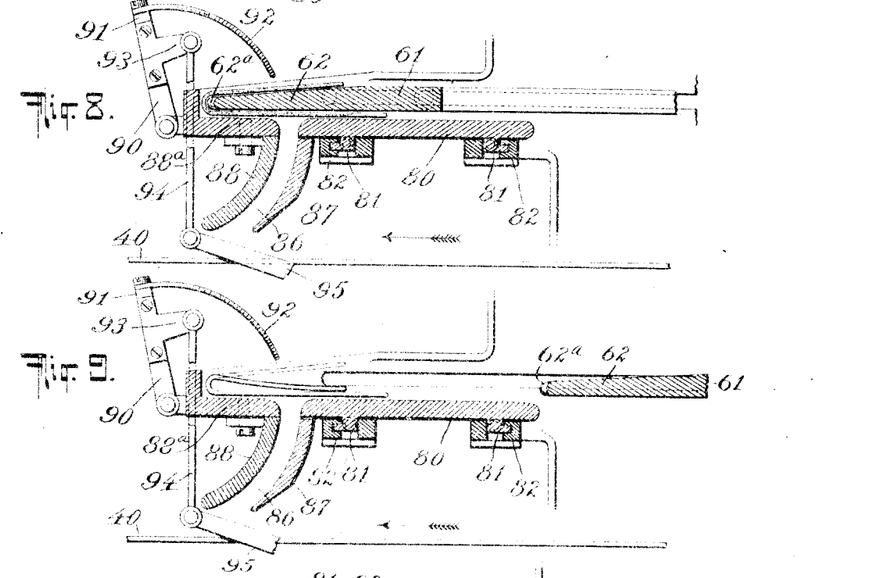
Figure 13:
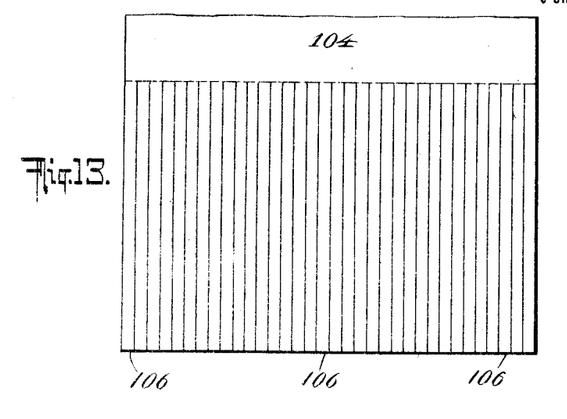
Fig. 13 is a plan illustrating the product of the first step in the method, that is to say, a series or plurality of side by side noodles formed from a sheet of dough, as by cutting, the position of the strips in the machine being shown in Fig. 7.
Figure 14:
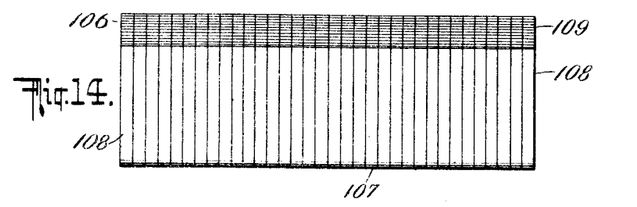
Fig. 14 is a plan illustrating the product of the second step in the method, that is to say, the strips of dough after the first fold, the position of the folded strips in the machine being shown in Fig. 8.

The operation of the machine is as follows:—If we assume the parts in substantially the position indicated in Fig. 5, it will be understood that as soon as power is applied to the driving shaft 26, such shaft will be rotated and will cause the end of the roll of the sheet of dough 104 to be fed between the sheeting rolls 41, 42 and thence between the cutting rolls 47 and 47ª by means of which latter, the sheet of dough is severed into a plurality of side by side narrow or parallel strips. As the dough which has been cut into the narrow strips drops between the cutting rolls 47, 47ª, the strips are engaged at a point intermediate of their ends or just below the middle thereof by the front edge of the folding plate or movable carrier 61, and as the severed portion of dough is about to be moved forward thereby, the rotary cutter 55 serves to sever said strips of dough into appropriate lengths as shown in Fig. 13. The operation of the rotary cutter 55 is effectuated by the sprocket chain 58 which works over the sprocket wheel 57 and the sprocket wheel 59 upon the cam shaft 60. The severed lengths of dough or strips to form the noodles are, from the position indicated in Fig. 7, carried forward by the folding plate or carrier 61 until the plate or carrier nearly assumes the position shown by dotted lines in Fig. 5, and in full lines in Fig. 8, in which position one layer of dough formed by the end portions of the strips defined by the working edge of said plate or carrier rests upon the inclined portion 62 of said plate or carrier, and the other layer of dough, forming the other end portions of the strips defined by the front edge of the plate or carrier, rests upon the upper surface of the shifting plate or table 80. The front edge of the said folding plate or carrier 61 produces a fold in the strips of dough indicated by 107 Fig. 14. At the completion of this step in the method of making noodles, there are produced a plurality of side by side or parallel strips 106, 106 having a single fold and also having short end portions 108 and longer end portions 109. In the act of folding by the folding plate or carrier 61 the shorter end portions 108 of the strips rest upon the inclined portion 62 of the plate or carrier, while the longer end portions 109 extend over and upon the opposite side of the said folding plate or carrier 61.

Figure 10:
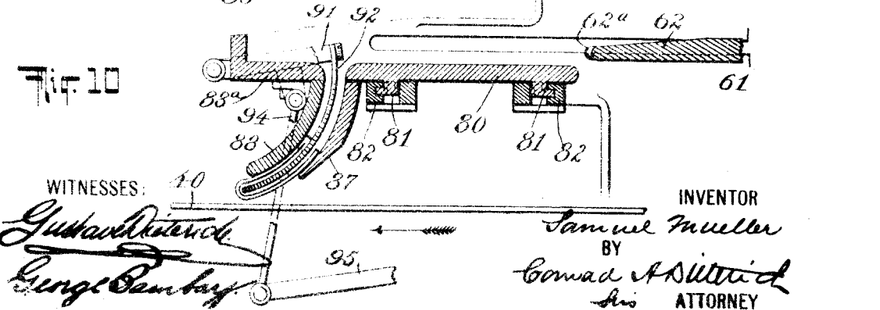
Figure 15:
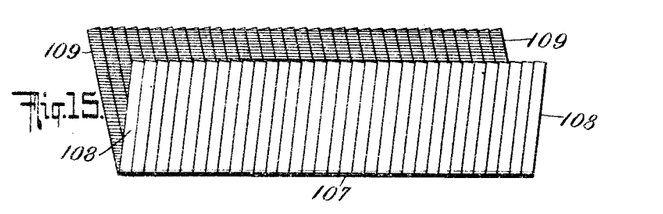
Fig. 15 is a plan view illustrating the product of the third step in the method, that is to say, the folded side by side strips with the end portions of the strips in one layer, spread apart or staggered relative to the end portions of the strips in the other layer.

In the carrying out of the specific method of making noodles by means of a machine such as described and shown, the strips folded, as before stated, are acted upon so as to produce a staggering of the end portions 108, 109 thereof relatively to the other end portions, as shown in Fig. 15. This effect is produced upon the single-folded strips before the plate or carrier 61 reaches the extreme limit of its forward movement, by means of the table or plate 80, which is moved transversely or bodily sidewise by the action of the projection 77 of the cam 76 engaging a roller 78 on said table or movable shifting plate. This movement of the table or shifting plate 80 causes the layer of folded strips of dough formed by the longer end-portions 109 resting upon the upper side of said table or plate and below the folding plate or carrier 61, to be moved sidewise thereon. The direction of movement of the table or shifting plate 80 is in a plane parallel with that of the plane of movement of the folding plate or carrier 61, but rectilinearly thereof. The end portions of the strips having been relatively spread apart or staggered so as to diverge the folding plate or carrier 61 is quickly retracted by the action of the cam 69 which engages the arm 66, and draws the upper end of said arm outwardly, the said folding plate or carrier being thereby moved to the position shown in full lines in Figs. 5 and 9. After the folding plate or carrier 61 has been retracted the individual strips of dough will be left in position upon the horizontal entrance end 88ª of the chute member 88 and upon the top of the table or shifting plate 80, the position of the folded strips being indicated by dotted lines in Fig. 9. Hereupon, the segmental or curved folder-plunger or folding plate 92 is caused to descend by the action of the cam 100. This cam receives its power from a sprocket chain 105 which passes over a sprocket wheel 106 arranged upon the shaft 101, and a sprocket wheel 106ª arranged upon the cam shaft 60 which cam 100 engages the stud 98 of rod 95 which is in turn connected by link 94 to the end of the projection 93 on the arm 90 and causes the folder-plunger 92 to descend. The said folder-plunger or folding plate 92 in descending engages the strips of folded dough lying in the position over the entrance end of the chute 88, and at the point shown in Fig. 9 and carries the said strips outwardly through the chute 86 as shown in Fig. 10. The folder-plunger or folding plate 92 in passing into and through the chute imparts a double fold indicated by 110 in Fig. 16; where the double folded strips are shown, obviously the double fold will be between the single fold 107 Fig. 14 and the ends of the end portions 108, 109, and will be parallel with the single fold 107. The shape of each individual dough strip folded as described is shown in Figs. 11 and 12, which illustrate the form of each complete noodle. Each noodle is composed of four layers of dough having a single fold at one end and two folds at the other end and has a zigzag form.

Figures 1, 2, 3:
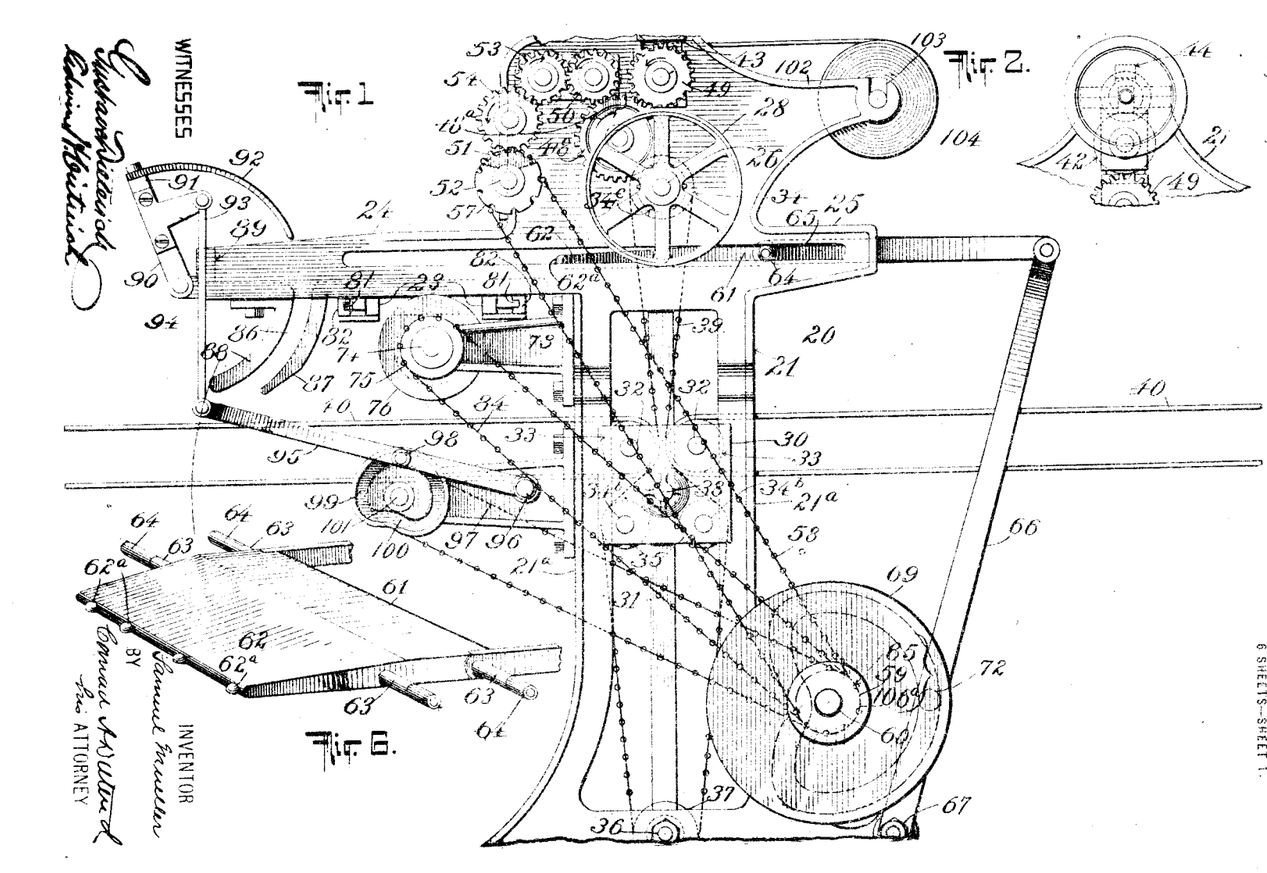
Figure 1 is a side view showing one form of machine constructed according to and embodying my said invention.
Fig. 2 is a detail view of the upper part of the machine as shown at Fig. 1 and constitutes the continuation thereof.
Fig. 3 is a plan view of the machine partially broken away.
Figure 3:
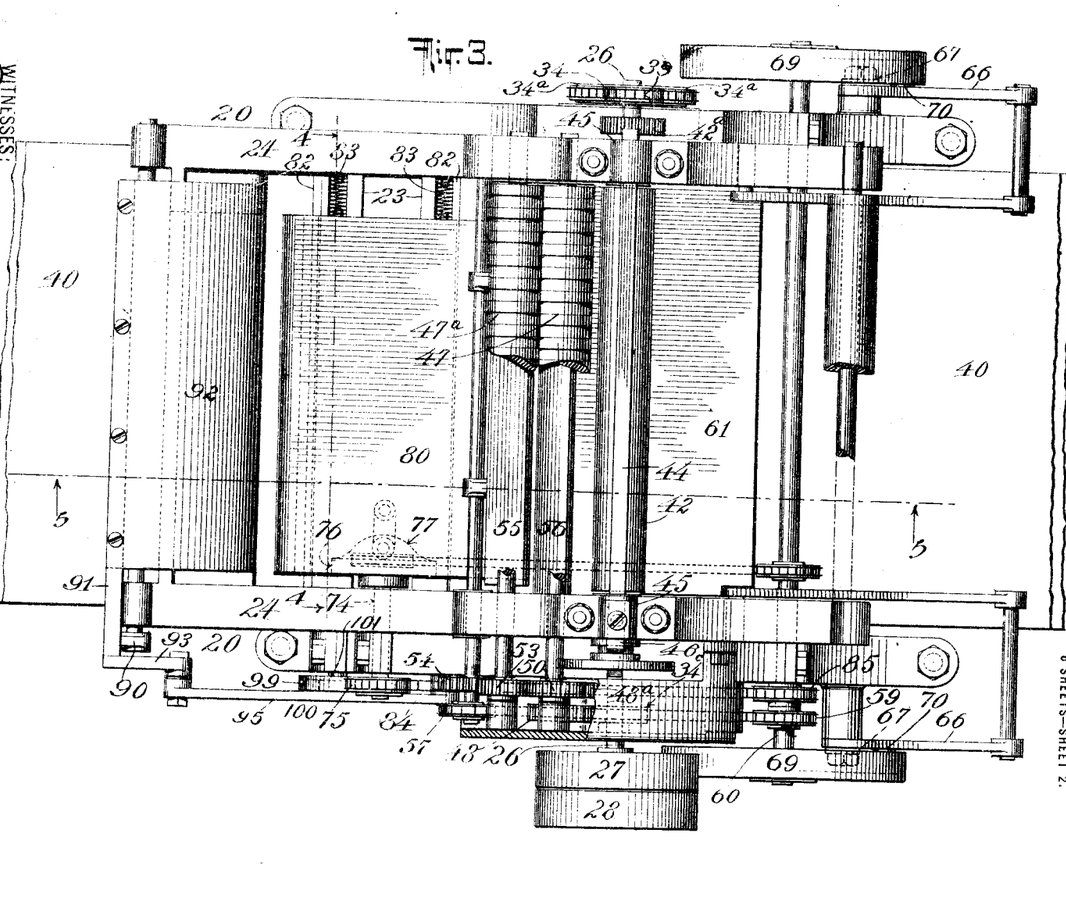
Figure 4:
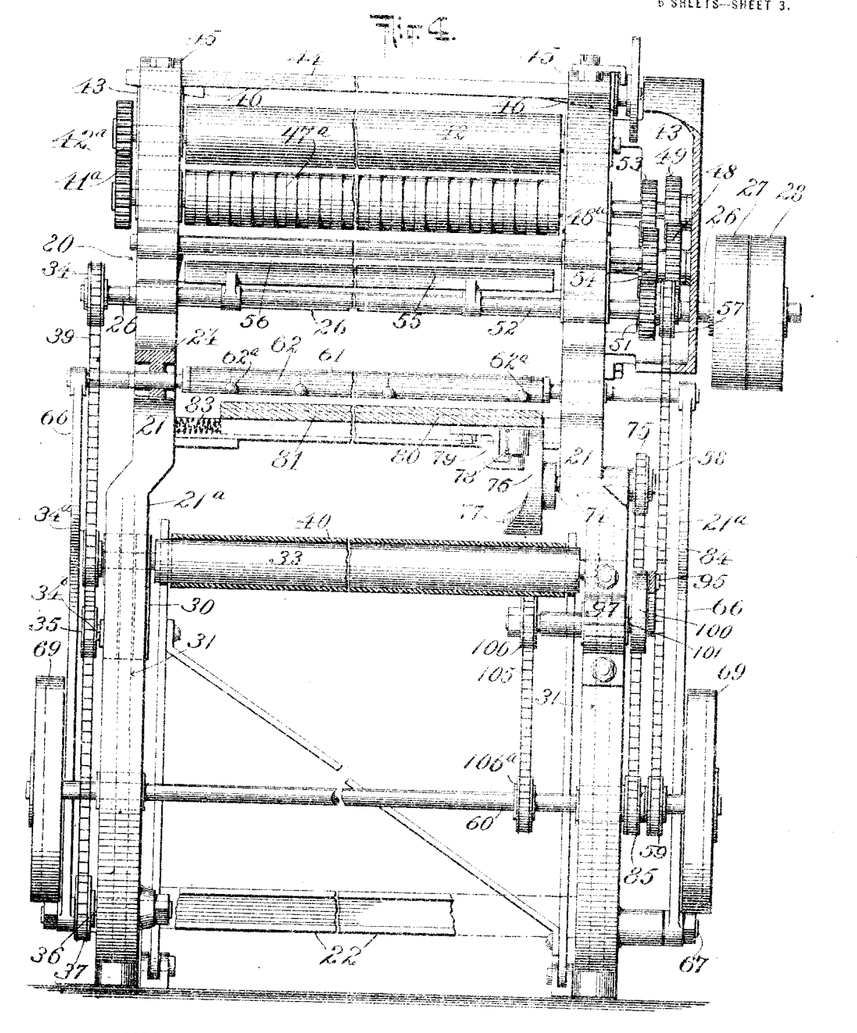
Fig. 4 is a transverse section taken on the line 4—4 of Fig. 3.
Figures 5, 11, 12:
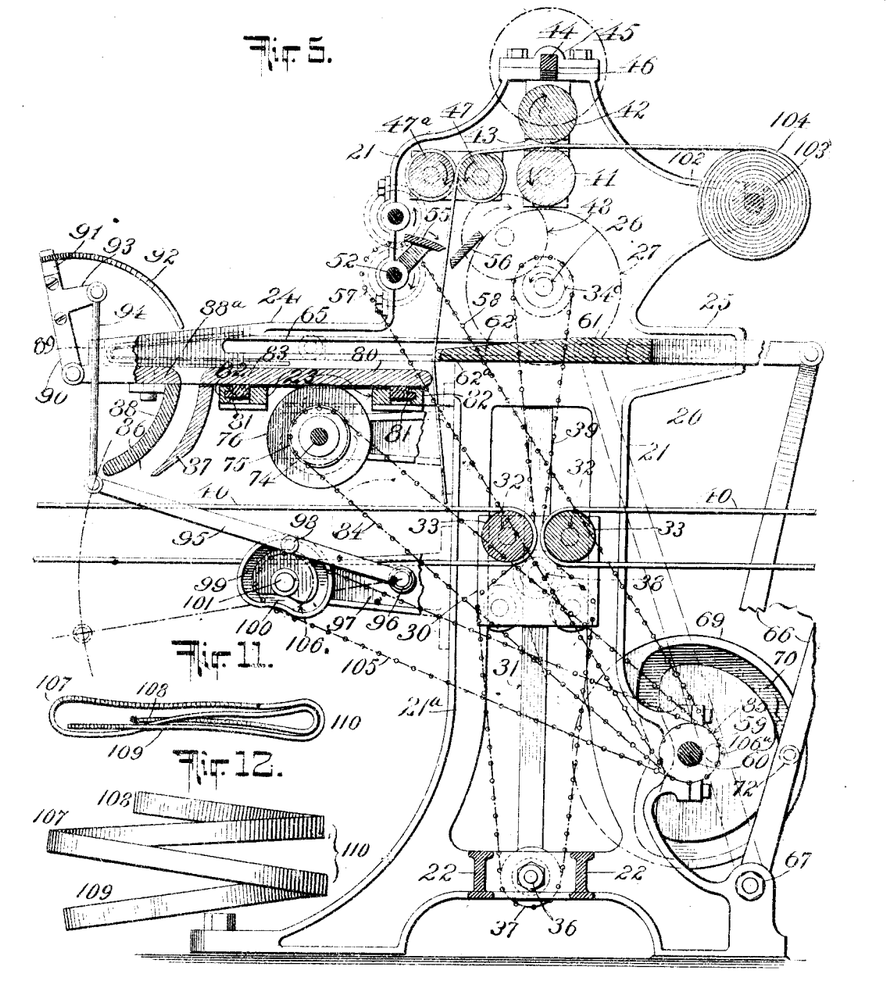
Fig. 5 is a longitudinal section taken on the line 5—5 of Fig. 3.
Fig. 11 is an edge view of a folded noodle.
Fig. 12 is a plan or top view thereof.
Figure 16:
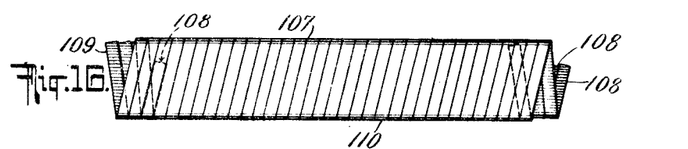
Fig. 16 is a plan illustrating the product of the final step in the method, that is to say, the complete noodles which have been again folded, and the noodles have been interlocked after the third step shown in Fig. 15, the position of the double folded and interlocked strips in the machine being shown in Fig. 10.

It will be clear on reference to Figs. 11 and 12, in connection with Fig. 16, that the transverse double folding of the previously folded and staggered strips of dough will cause an interlocking of the adjacent strips, the folded end portions 108 of each previously single folded strip being then interlocked with the folded end portions 109 of the next or adjacent strips. The folded and interlocked strips of dough or noodles are, after the described double-folding, delivered from the end of the chute 86 to suitable trays, and are arranged upon the conveyer 40 in order to conduct the noodles from the end of the machine in a continuous series of transversely arranged rows with the laterally diverging end portions of said noodles interlocked. This movement may be continuous or intermittent as desired.

Obviously, the described method can be used in folding a single strip of dough as well as a plurality of side by side strips, and it is in like manner clear that the step, in the method, of interlocking the noodles may be omitted, in which case the table or plate 80 or a corresponding part would remain stationary or at least would have no movement such as to cause the interlocking. In such event, the side by side noodles would not be interlocked and the ends of each noodle would lie one above the other and not sidewise or laterally of each other.

It is to be distinctly understood that my invention comprehends such simpler method whether the action of the machine be upon a single strip or length of dough or upon a plurality of side by side strips of dough cut from a sheet of dough.

In this application the process or method of folding the noodles is not claimed as the same constitutes the subject matter of a divisional application, filed October 21, 1915, Serial No. 57,110.

Having thus described my invention, what I claim and desire to secure by Letters Patent is:

1. In a machine of the character described, the combination of means for folding a strip of dough at an intermediate portion, means for spacing apart the ends of said strip sidewise in the plane of the folded strip, and means for folding said folded strip crosswise, substantially as specified.

2. In a machine of the character described, the combination of means for folding a long, relatively narrow body of dough at an intermediate portion, means for spacing apart the ends of said body sidewise in the plane of the folded body, and means for folding said folded body crosswise, substantially as specified.

3. In a machine of the character described, the combination of means for forming a strip from a sheet of dough, means for folding said strip of dough at an intermediate portion, means for spacing apart the ends of said strip sidewise in the plane of the folded strip, and means for folding said folded strip crosswise, substantially as specified.

4. In a machine of the character described, the combination of means for transversely folding a series of side by side, long, relatively narrow bodies of dough, and means for interlocking said bodies, substantially as specified.

5. In a machine of the character described, the combination of means for transversely double-folding a series of side by side strips of dough, and means for concurrently therewith interlocking the adjacent strips, substantially as specified.

6. In a machine of the character described, the combination of means for folding a layer comprising a series of side by side, long, relatively narrow bodies of dough, at intermediate portions of said bodies, to produce two layers and a single fold, means for spacing apart the end portions of each folded body sidewise in the plane of the layers to stagger the end portions in one layer relatively to the end portions in the other layer, and means for folding said folded bodies of the two layers crosswise between their ends and the first fold, substantially as specified.

7. In a machine of the character described, the combination of means for folding a layer comprising a series of side by side, long, relatively narrow bodies of dough, at intermediate portions of said bodies, and means moving in a plane parallel with said folding means for simultaneously therewith spacing apart the end portions of each body sidewise in the plane of the folded bodies to stagger the end portions in one layer relatively to the end portions in the other layer, and means moving across the path of movement of said folding means to fold said folded bodies of the two layers crosswise between their ends and the first fold, substantially as specified.

8. In a machine of the character described, the combination, with means for forming a plurality of side by side, long, relatively narrow bodies of dough, in one layer, and means for conveying the finished product from the machine, of mechanism intermediate said forming means and said conveying means, comprising means for folding the layer of bodies at intermediate portions to produce two layers and a single fold, means for spacing apart the end portions of each body sidewise in the planes of the layers to stagger the end-portions in one layer relatively to the end portions in the other layer, and means for folding the folded bodies of the two layers crosswise between their ends and said first fold, whereby four layers are produced comprised of interlocked bodies of dough, substantially as specified.

9. In a machine of the character described, the combination of means for folding a layer comprising a series of side by side, long, relatively narrow bodies of dough, at intermediate portions of said bodies, means moving in a plane parallel with said folding-means for simultaneously therewith spacing apart the end portions of each folded strip sidewise in the plane of the folded bodies to stagger the end portions in one layer relatively to the end portions in the other layer, and means for folding the folded bodies of the two layers crosswise between their ends and the first fold, substantially as specified.

10. In a machine of the character described, the combination of means for folding a strip of dough longitudinally into a zigzag form, substantially as specified.

11. In a machine of the character described, the combination of means for folding a strip of dough into the form of a W, substantially as specified.

12. In a machine of the character described, the combination of means for folding a strip of dough with its free ends extending in the same general direction and spaced from one another laterally in the plane of the folded strip, substantially as specified.

13. In a machine of the character described, the combination of means for forming a series of folded interlocked dough elements, substantially as specified.

14. In a machine of the character described, the combination of means for forming a series of interlocking dough elements, each element having a zigzag form, substantially as specified.

15. In a machine of the character described, the combination of means for forming a plurality of side by side, long, relatively narrow bodies of dough, a folding plate having a reciprocatory movement whereby it is adapted to produce transverse folds in said bodies, and means for folding the folded bodies, substantially as specified.

16. In a machine of the character described, the combination of means for forming a plurality of side by side, long, relatively narrow bodies of dough, a folding plate having a reciprocatory movement whereby it is adapted to produce transverse folds in said bodies, and a folder for folding the folded bodies, having a reciprocatory movement across the path of movement of said folding plate, substantially as specified.

17. In a machine of the character described, the combination of means for forming a plurality of side by side, long, relatively narrow bodies of dough, a folding plate and an opposing member exemplified by a table, which, in conjunction with said plate folds said elongated bodies, substantially as specified.

18. In a machine of the character described, the combination of means for forming a plurality of side by side, long, relatively narrow bodies of dough, a horizontal folding plate having a reciprocatory movement, whereby it is adapted to produce transverse folds in said bodies, and a horizontal table over which said plate folds said bodies, substantially as specified.

19. In a machine of the character described, the combination of means for forming a plurality of side by side, long, relatively narrow bodies of dough, means for folding said bodies, a chute to which the folded bodies are conducted, and means for double-folding the folded bodies within said chute, substantially as specified.

20. In a machine of the character described, the combination of means for forming a plurality of side by side, strips of dough, means for folding said strips, a chute to which the folded strips are passed, and means for double-folding the folded strips within and conducting them from said chute, substantially as specified.

21. In a machine of the character described, the combination of means for forming a plurality of side by side, long, relatively narrow bodies of dough, means for folding said bodies, a chute to which said folded bodies are conducted, and a folder-plunger for engaging said folded bodies and folding them within said chute, substantially as specified.

22. In a machine of the character described, the combination of means for folding a plurality of side by side, long, relatively narrow bodies of dough, a chute to which the folded strips are passed, and a folder-plunger for engaging the folded strips and again folding them within said chute, substantially as specified.

23. In a machine of the character described, the combination of means for forming a plurality of side by side, long, relatively narrow bodies of dough, means for folding said bodies, a chute to which the folded bodies are conducted, means for delivering said folded bodies through the chute, and a conveyer for receiving the folded bodies from said chute, substantially as specified.

24. In a machine of the character described, the combination of a chute, means for conducting long, relatively narrow bodies of dough thereto, and means for folding said bodies within said chute, substantially as specified.

25. In a machine of the character described, the combination of a chute, means for conducting strips of dough thereto, and means for folding said strips within said chute, substantially as specified.

26. In a machine of the character described, the combination of a chute, means for conducting strips of dough thereto, and means for folding said strips within said chute, and discharging the same therefrom, substantially as specified.

27. In a machine of the character described, the combination of a chute, means for conducting long, relatively narrow bodies of dough thereto, and a folder-plunger for folding said bodies within said chute and forcing them therefrom, substantially as specified.

28. In a machine of the character described, the combination of a curved chute, means for conducting long, relatively narrow bodies of dough thereto, and a correspondingly curved folder-plunger for folding said bodies in said chute and forcing them therefrom, substantially as specified.

29. In a machine of the character described, the combination of a chute, means for conducting long, relatively narrow bodies of dough thereto, and an oscillatory folder located outside said chute for folding said bodies into said chute, substantially as specified.

30. In a machine of the character described, the combination of a chute, means for conducting long, relatively narrow bodies of dough thereto, an oscillatory folder located outside said chute for folding said bodies into said chute, and means for actuating said folder, substantially as specified.

31. In a machine of the character described, the combination of a chute, means for conducting long, relatively narrow bodies of dough thereto, means for folding said bodies within said chute, and a conveyer for receiving the folded bodies from said chute, substantially as specified.

32. In a machine of the character described, the combination of a reciprocatory plate for receiving long, relatively narrow bodies of dough, and a table or plate in coöperation with which said reciprocatory plate folds said bodies, substantially as specified.

33. In a machine of the character described, the combination of a reciprocatory plate for receiving strips of dough, and a table or plate in coöperation with which said reciprocating plate folds said strips, substantially as specified.

34. In a machine of the character described, the combination of a reciprocatory plate for receiving long, relatively narrow bodies of dough, a table or plate in coöperation with which said reciprocatory plate folds said bodies, and means for reciprocating said table in a direction transversely to the movement of said plate, whereby said bodies are folded and their end portions spread apart, substantially as specified.

35. In a machine of the character described, the combination of means for forming a series of side by side folded interlocked dough elements with the folded portions of adjacent elements in parallelism, substantially as specified.

36. In a machine of the character described, the combination of means for forming a series of side by side folded interlocked dough elements having their several corresponding folded portions in parallelism, substantially as specified.

37. In a machine of the character described, the combination of means for forming a series of folded noodles, having their free ends extending in the same general direction from the fold and means for overlapping the free ends of adjacent noodles, substantially as specified.

38. In a machine of the character described, the combination of means for forming a series of noodles, and means for interlocking adjacent noodles, substantially as specified.

39. In a machine of the character described, the combination of means for forming a series of noodles, and means for interlocking the ends of adjacent noodles, substantially as specified.

40. The combination of means for severing a sheet of dough into ribbons, means for cutting the ribbons into suitable lengths, a folding member past which the ribbons are fed, and an adjustable reciprocating folding member for folding the ribbons and depositing them on top of the first mentioned folding member.

11. The combination with means for feeding a ribbon of dough, of a reciprocating folding member past which the ribbon is fed, a table onto which the folded ribbon is moved by the reciprocating folding member, a chute below said table across the top of which the folded ribbon extends when placed on the table by the reciprocating folding member, and an oscillating folding member which engages the folded ribbon, moves it through the chute and folds it while being thus moved.

12. In a machine for making noodles, the combination of a horizontally reciprocating folder adapted to engage a vertically arranged suspended ribbon of dough intermediate its ends, and a folder member coöperating with said reciprocating member to fold the ribbon and which is provided with means for giving a sidewise movement to the lower fold of the noodle relatively to the upper fold thereof while the reciprocating folder supports the upper fold of the ribbon.

13. In a machine for making noodles, the combination of a horizontally reciprocating folder, adapted to engage a vertically arranged suspended ribbon of dough intermediate its ends, a board coöperating with said folder upon which the noodle is deposited while being folded, and means for giving a sidewise movement to the lower fold of the noodle relatively to the upper fold thereof before the folding operation is completed and while the upper fold of the noodle is held or supported by the reciprocating folder.

44. Folding mechanism for noodles and the like, comprising horizontally reciprocating means for folding a vertically arranged suspended strip or ribbon of dough, and means for moving sidewise one fold of the ribbon relatively to the other fold thereof before the folding operation is completed and while the upper fold is supported by the folding devices.

45. The combination of means for feeding a ribbon of dough, a member past which the dough strands are fed and which has a reciprocating motion and serves to effect a primary folding, a support onto which the folded strands are brought by the reciprocating folding member, and means for effecting a secondary folding of said primarily folded strands, said means including a passageway leading below said support and across the top of which said primarily folded strands are placed by said reciprocating folding member, and an oscillating member which coöperates with said passageway in the formation of said secondary fold.

Signed at the city of New York, in the county and State of New York, this thirteenth day of October, nineteen hundred and nine.

SAMUEL MUELLER.

Witnesses:
  Conrad A. Dieterich,
  Helen Sullivan.